United States Patent
Wolfgang et al.

(10) Patent No.: US 8,047,091 B2
(45) Date of Patent: Nov. 1, 2011

(54) METHOD FOR CONTROLLING AN AUTOMATIC VEHICLE TRANSMISSION IN ORDER TO REDUCE BACK-AND-FORTH SHIFTING

(75) Inventors: Werner Wolfgang, Ravensburg (DE); Maik Würthner, Friedrichshafen (DE); Ingo Sauter, Aberdeen, NC (US); Achim Tegen, Troisdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 908 days.

(21) Appl. No.: 11/815,464

(22) PCT Filed: Feb. 1, 2006

(86) PCT No.: PCT/EP2006/000834
§ 371 (c)(1),
(2), (4) Date: Mar. 7, 2008

(87) PCT Pub. No.: WO2006/082026
PCT Pub. Date: Aug. 10, 2006

(65) Prior Publication Data
US 2008/0274857 A1   Nov. 6, 2008

(30) Foreign Application Priority Data
Feb. 5, 2005   (DE) .................. 10 2005 005 379

(51) Int. Cl.
*F16H 61/10*   (2006.01)
(52) U.S. Cl. ..................................... 74/336 R; 475/121

(58) Field of Classification Search .................. 477/901; 74/336 R; 475/121
See application file for complete search history.

(56) References Cited

U.S. PATENT DOCUMENTS

| | | |
|---|---|---|
| 5,474,507 A | 12/1995 | Streib et al. |
| 5,624,351 A | 4/1997 | Fujita et al. |
| 5,643,133 A | 7/1997 | Minowa et al. |
| 5,816,950 A | 10/1998 | Kamada et al. |
| 2007/0099752 A1* | 5/2007 | Saito et al. ..................... 477/34 |
| 2011/0035124 A1* | 2/2011 | Gentile et al. .................. 701/58 |
| 2011/0130928 A1* | 6/2011 | Matsunaga et al. ............. 701/52 |

FOREIGN PATENT DOCUMENTS

| | | |
|---|---|---|
| DE | 4329908 A1 | 3/1995 |
| EP | 0798496 A1 | 10/1997 |
| GB | 2012892 A | 8/1979 |

* cited by examiner

*Primary Examiner* — Sherry Estremsky
(74) *Attorney, Agent, or Firm* — Davis & Bujold, P.L.L.C.

(57) ABSTRACT

A method of controlling an automatic transmission of a motor vehicle having clutches controlled by an electronic control unit. A transmission rotational speed in an initial transmission stage is determined. If a first transmission shifting rotational speed is reached, the transmission is shifted from the initial transmission stage to a target transmission stage. A target transmission rotational speed of the target transmission stage is then ascertained. A difference is next ascertained between the target transmission rotational speed and a second shifting transmission rotational speed. An initial counter value, of a counter, is determined, which depends on the transmission rotational speed difference. The counter is next caused to carry out counting, from the initial counter value, as time progresses. If and when the counter value reaches zero, the transmission is shifted from the target transmission stage toward the initial transmission stage.

16 Claims, 4 Drawing Sheets

METHOD FOR CONTROLLING AN AUTOMATIC VEHICLE TRANSMISSION IN ORDER TO REDUCE BACK-AND-FORTH SHIFTING

This application is a national stage completion of PCT/EP2006/000834 filed Feb. 1, 2006 which claims priority from German patent application serial no. 10 2005 005379.3 dated Feb. 5, 2005.

FIELD OF THE INVENTION

The invention relates to a method of controlling an automatic transmission of a motor vehicle.

BACKGROUND OF THE INVENTION

It is known that the shifting point for shifting from one transmission stage to another transmission stage, of an automatic transmission of a vehicle can be influenced by various factors. Among these are, e.g., the position of the gear selection lever, program switches, kick-down switches, transmission fluid temperature (or transmission lubricant temperature), rotational speed of the transmission input, and/or braking signals. Many times, in practice, an automatic transmission will execute a shift to a higher or lower transmission stage in a relatively short time period, namely when the automatic control criteria for such shifting of the transmission are satisfied. The result may be rapid back and forth shifting between two transmission stages, sometimes called "oscillative shifting".

Such back and forth shifting may occur, e.g. when negotiating mountain roads. At constant load, the traction force of the engine after an up-shift is less than the sum of the forces of resistance to the forward motion of the vehicle, wherewith the acceleration of the vehicle decreases until eventually the absolute speed of the vehicle is decreased. If a limit value is reached at which a down-shift ought to be performed, the transmission is caused to so downshift, into a lower transmission stage. In such a lower transmission stage, the traction force is now greater than the aggregate resistance forces, so that the vehicle can again accelerate. If the driver seeks to accelerate, he will continue driving in this mode until once again a limit value is reached at which up-shifting ought to be performed. Such a back and forth shifting between transmission stages, when carried out by an automatic transmission, is regarded as an unpleasant occurrence, because each shifting process entails disengagement of a coupling and thereby interruption of the tractional force.

In the light of this, the underlying problem of the present invention was to devise a means of controlling the shifting point for selecting the currently most favorable transmission stage, in an automatic transmission of a vehicle, whereby disadvantageous back and forth shifting (oscillative shifting) is avoided or is at least reduced.

SUMMARY OF THE INVENTION

The invention is based on the concept that frequent shifting between two transmission stages can be reduced if the time for the decision to shift is suitably delayed. If a counter is started immediately after a limit value is exceeded, which limit value is established by the shifting from one transmission stage to another, it may be provided that shifting the transmission stage will be possible only if the counter value of the counter reaches the value zero.

The point of departure of the invention is a method of controlling an automatic transmission having clutches controlled by an electronic control unit, the method comprises the following steps: A transmission rotational speed in an initial transmission stage is determined; If a first transmission shifting rotational speed is reached, the transmission is shifted from the initial transmission stage to a target transmission stage; and A target transmission rotational speed in the target transmission stage is ascertained. It is further provided that the method comprises the following additional steps: A difference is ascertained between the target transmission rotational speed and a second shifting transmission rotational speed, which latter comprises a number between the initial transmission rotational speed and the target transmission rotational speed; An initial counter value, of a counter, is determined, which depends on the transmission rotational speed difference; The counter is caused to count, from the initial counter value, as time progresses; and If and when the counter value reaches zero, the transmission is shifted from the target transmission stage to the initial transmission stage.

Preferably, it may further be provided that the target transmission stage is a higher transmission stage than the initial transmission stage, and the second transmission shifting rotational speed is a shifting rotational speed for down-shifting to a lower transmission stage, in the direction toward the initial transmission stage. In this way, one avoids premature down-shifting to a lower transmission stage after up-shifting to a higher transmission stage.

Also preferably, it may be provided that, beginning from the starting counter value, the counter decreases, if the vehicle speed is increased in a manner such that the speed increase falls below a predetermined value. This is advantageous in that the delay, imposed before down-shifting to a lower transmission stage can be performed, is reduced. By decreasing the counter value in this way, one avoids driving the vehicle for an excessively long time in an excessively high transmission stage.

Further, it may be advantageous to provide that the counter value is increased, from a previously reduced starting counter value, if the vehicle speed is increased such that a predetermined speed increase is exceeded.

This is advantageous because it takes into account the fact that when the speed increase is sufficiently high, the likelihood that there will be a need to downshift to a lower transmission stage is reduced. The described increasing of the counter value allows further delay until the counter value is decreased to zero, thereby reducing the likelihood of undesirable "oscillative shifting".

It may be additionally provided that the starting counter value is set to a relatively high starting counter value, if the value of the transmission rotational speed difference is relatively low. This is advantageous because when the transmission rotational speed difference is low, a longer delay should be imposed on down-shift, in order to avoid "oscillative shifting". A high starting counter value imposes a relatively long time interval until the counter value reaches zero and causes actuation of the down-shift.

Preferably it may also be provided that the starting counter value is set to a relatively low starting counter value, if the value of the transmission rotational speed difference is relatively high. This is advantageous because when the transmission rotational speed difference is high, it is not necessary to impose more than a very short delay. The low starting counter value means that the counter value will reach zero relatively quickly, causing actuation of the down-shift.

According to another variant, it may advantageously be provided that the target transmission stage is a lower transmission stage than the initial transmission stage, and the second transmission shifting rotational speed is a shifting rotational speed for up-shifting into a higher transmission stage, in the direction toward the initial transmission stage. In this way, one avoids a premature up-shift after a down-shift.

It may further provided, preferably, that the counter value increases, from a previously reduced starting counter value, if the vehicle speed is slowed such that a predetermined speed reduction value is exceeded. This is advantageous because as the speed reduction increases the transmission rotational speed decreases, thereby reducing the likelihood of an up-shift. In accord with this, increasing the counter value delays reaching the shifting point.

Also, advantageously it may be provided that the counter value decreases from the starting counter value if the vehicle speed is slowed in such a manner that a predetermined speed reduction value is not exceeded. This is advantageous because the transmission rotational speed increases as braking is decreased, wherewith it is necessary to very quickly shift to a higher transmission stage. The decreasing of the counter value results in the counter value reaching zero sooner, whereby the up-shifting is actuated.

It may be additionally advantageously provided that the starting counter value is set to a relatively high starting counter value, if the value of the transmission rotational speed difference is relatively low. If the transmission target rotational speed is only slightly higher than the second transmission shifting rotational speed, then by setting the starting counter value relatively high one can avoid a premature up-shift.

Further, it may be provided that the starting counter value is set to a relatively low starting counter value, if the value of the transmission rotational speed difference is relatively high. In this way, the counter value can reach zero relatively quickly, so that the delay in up-shifting is only for a short period.

According to the invention, it may be additionally advantageously provided that a counter value characteristic curve or a table of counter values is employed to determine the decrement value (or increment value) by which the starting counter value is to be decreased (or increased). By these means (e.g. a characteristic curve), the current decrement or increment may be determined depending on the increase in speed of the vehicle, or particularly on the increase (or decrease) in the rotational speed of the transmission input shaft and the, thus determined, decrement or increment may be used to adjust the counter value.

The change in the rotational speed of the input shaft of the transmission is a preferred parameter, because this value, multiplied by the current transmission stage, in fact represents the vehicle acceleration. In this way, one can take into account the fact that the possible torque from the drive train, and thereby the possible acceleration of the vehicle, increases with a decrease in the transmission stage.

Finally, it is provided according to the invention that the shifting rotational speeds for possible up-shifting and possible down-shifting, respectively, from the current transmission stage, are determined continually and generally simultaneously in parallel. Accordingly, for each of the two operating modes (up-shifting and down-shifting) a separate counter is employed for applying increments (or decrements) to the respective counter state. A particular up-shift or down-shift procedure is actuated only if, and when, the counter corresponding to the current operating mode has reached zero. Thus, the calculations for both operating modes can be performed simultaneously, and the shifting rotational speeds may even coincide.

BRIEF DESCRIPTION OF THE DRAWINGS

The invention will be described in more detail hereinbelow, based on an exemplary embodiment, with reference to the accompanying drawings, in which.

DETAILED DESCRIPTION OF THE PREFERRED EMBODIMENTS

Figure 1:
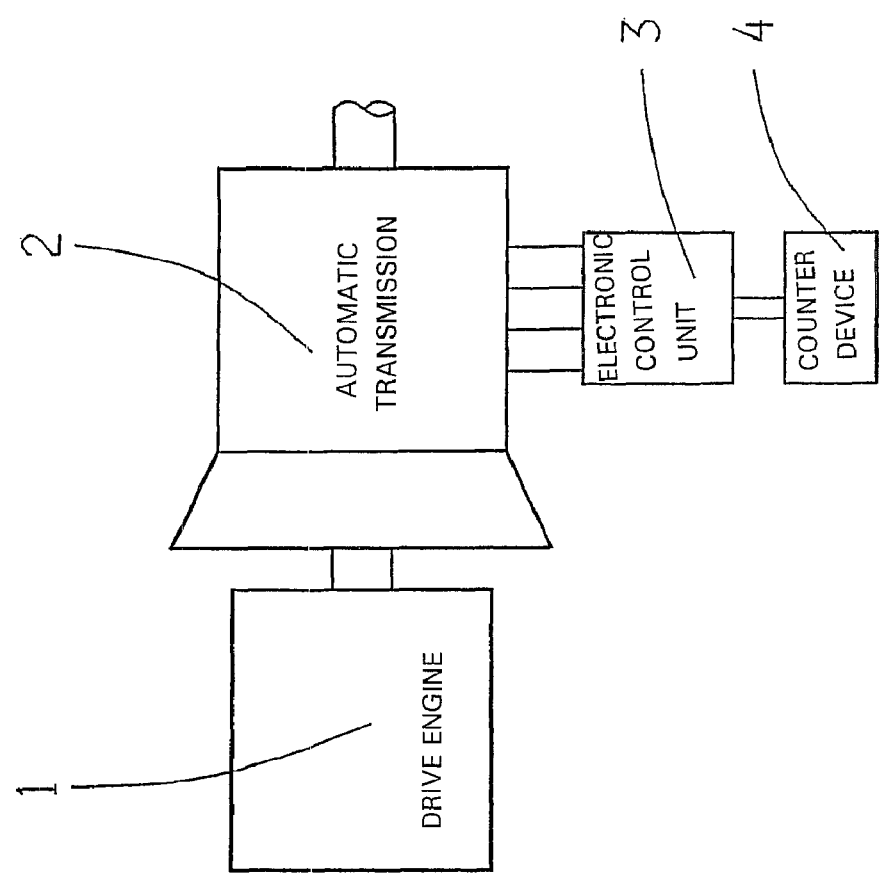
FIG. 1 is a schematic representation of a drive engine and an automatic transmission.

FIG. 1 shows a drive engine 1 of the drive train of a motor vehicle, the engine is drivingly coupled to an associated automatic transmission 2. An electronic control unit 3 controls control valves, which govern actuation of the transmission 2 clutches. The electronic control unit 3 is connected to a counter device 4, which serves to influence the shifting of the transmission from one transmission stage into another. The counter 4 may be a component in the electronic control unit 3.

Preferably, separate counters (4) are provided for up-shifting and down-shifting, so that, advantageously, the respective calculations for possible up-shifting and possible down-shifting can proceed substantially parallelly in time.

Figure 2:
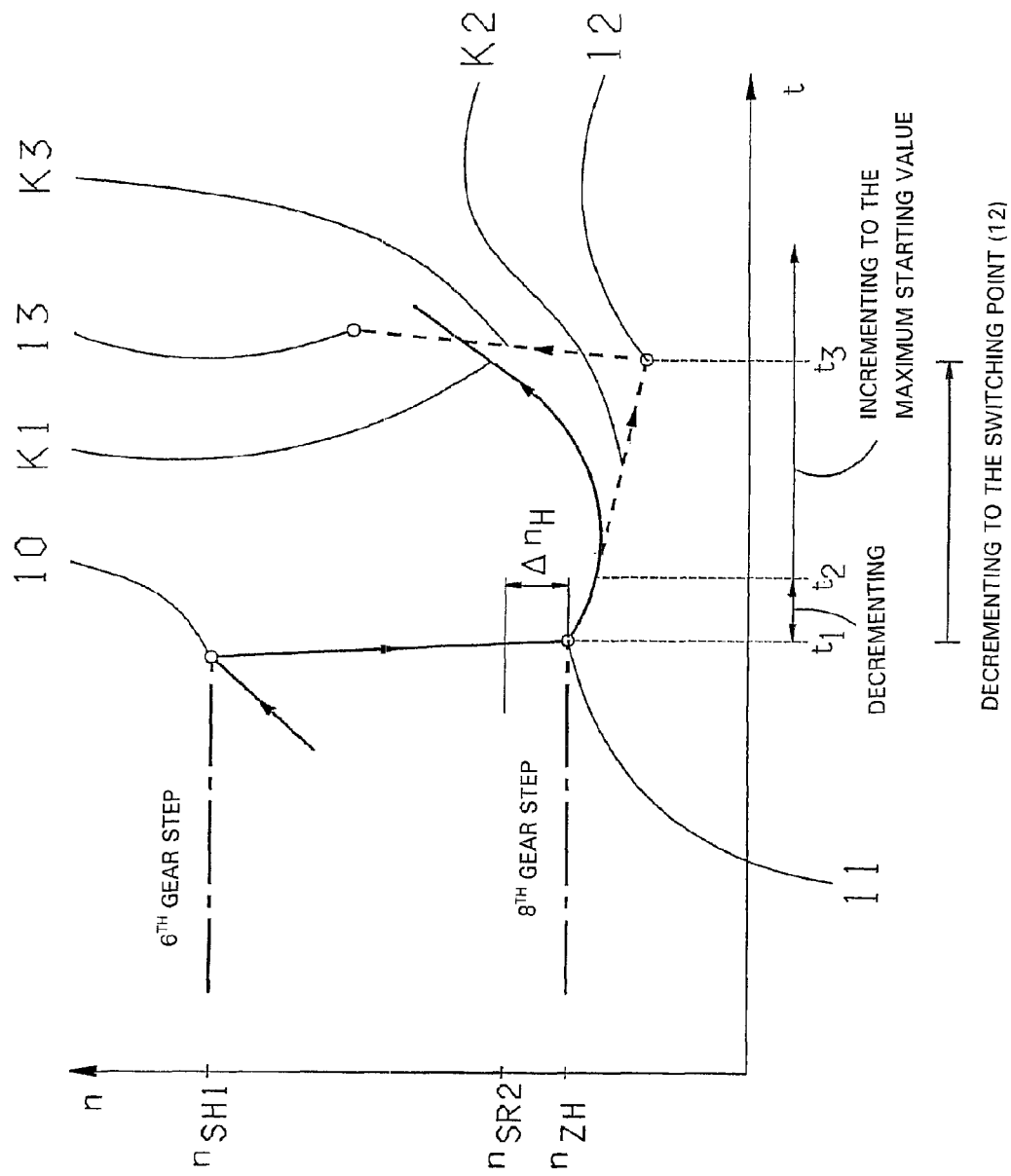
FIG. 2 is a rotational speed diagram in which rotational speed is plotted versus time, illustrating an up-shift from a lower transmission stage to a higher transmission stage, according to the invention.

FIG. 2 is an rotational speed diagram in which the rotational speed, n, of the transmission is plotted versus time, t. If the rotational speed of the transmission input shaft increases to reach a value $n_{SH1}$, the electronic control unit 3 actuates an up-shift to a higher transmission stage (in this example, shifting from the 6th transmission stage to the 8th transmission stage).

With this shifting, the rotational speed decreases from the shifting rotational speed $n_{SH1}$ of the lower transmission stage (point 10 in FIG. 2) to a target rotational speed of the higher transmission stage (point 11 in FIG. 2, at time $t_1$). The target rotational speed $n_{ZH}$, following the up-shift, can be less than the second shifting rotational speed $n_{SR2}$. The difference in transmission rotational speeds, $\Delta n_H$, being the difference between the second transmission shifting rotational speed $n_{SR2}$ and the transmission target rotational speed $n_{ZH}$, determines a starting counter value for the counter 4. If the difference in transmission rotational speeds, $\Delta n_H$, reaches a high value, then the starting counter value is set to a relatively low counter value.

The value of the difference in transmission rotational speeds and the starting counter value are continually determined during operation of the vehicle. In this connection, the starting counter value is defined as a maximum value of the counter 4, so that after the beginning of each counting process, the counter value can only be decreased. As soon as the value falls below the starting counter value, the process of increasing the current counter value to the starting counter value can be resumed.

The further course of the rotational speed curve then determines whether, beginning with the starting counter value, the counter value continually decreases or whether after an initial decrease the counter value subsequently increases. After time $t_2$, the counter value increases, if the vehicle undergoes acceleration and the rotational speed increases. In FIG. 2 the portion of the curve is designated K1. In the case of deceleration, with reduced speed, the counter value decreases such that after a relatively short time the counter value reaches zero ($t_1$ to $t_3$, compared to $t_1$ to $t_2$).

If, at the higher transmission stage, the course of the rotational speed is generally that of curve branch K2 (FIG. 2), at point 12 the transmission will be shifted back to a lower transmission stage, if the counter value has been reduced to zero ($t_3$). Thus, this down-shifting will be in the direction toward the initial transmission stage. The shift from the 8th transmission stage may be to a 7th transmission stage (point 13, in FIG. 2) or to the 6th transmission stage. Indeed, it is quite possible for shifting from the 8th transmission stage to be to the 5th transmission stage, if this does not correspond to an excessively high rotational speed.

Figure 3:
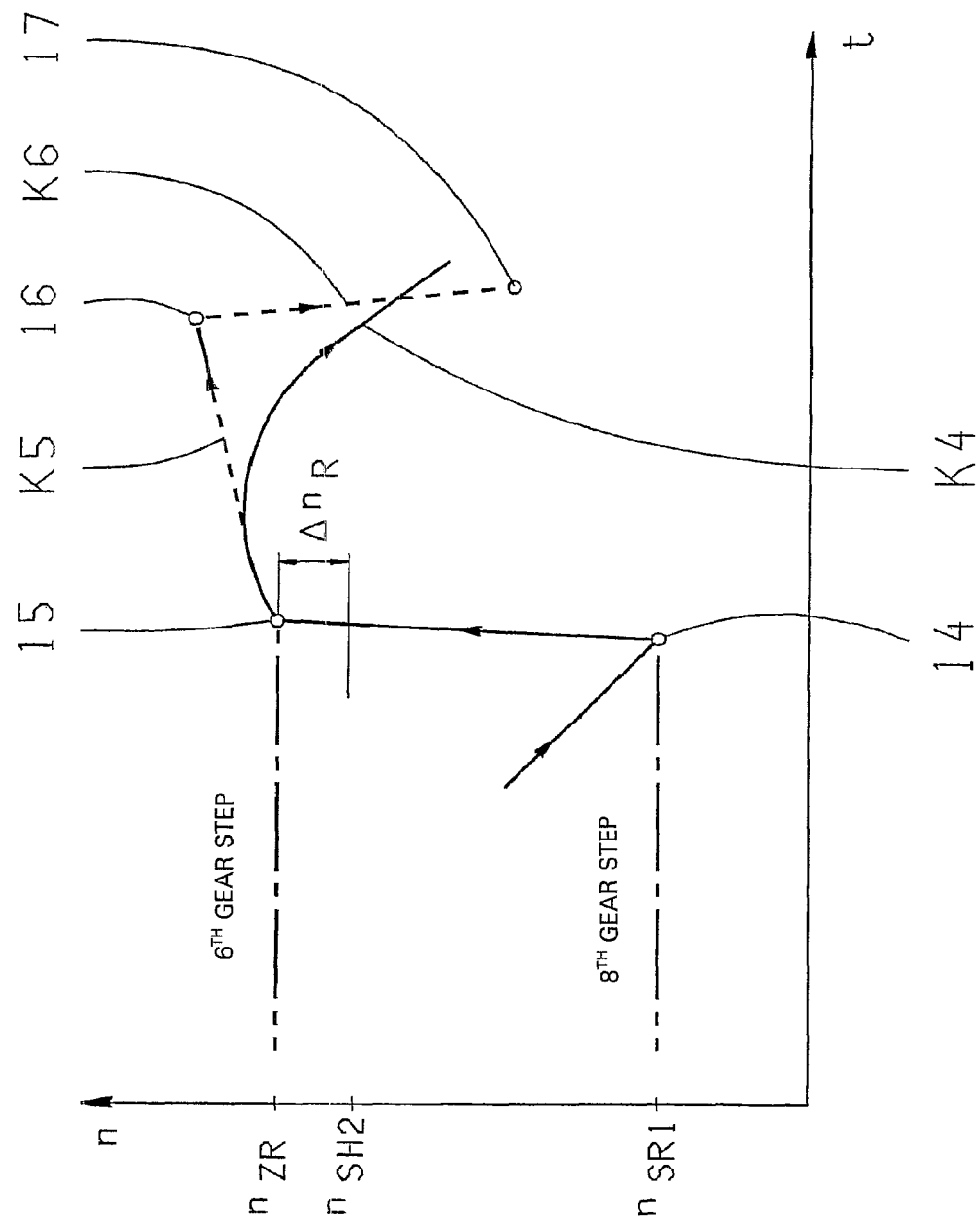
FIG. 3 is a rotational speed diagram in which rotational speed is plotted versus time, illustrating a down-shift from a higher transmission stage to a lower transmission stage, according to the invention.

FIG. 3, analogously to FIG. 2, illustrates a situation wherein downshifting occurs from a higher transmission stage to a lower transmission stage (in this example, from the 8th transmission stage to the 6th transmission stage).

If the transmission rotational speed reaches the first shifting rotational speed, $n_{SR1}$ (point 14 in FIG. 3), the transmission is downshifted from a higher transmission stage to a lower transmission stage (namely from the 8th transmission stage to the 6th transmission stage at point 15 in FIG. 3). The transmission target rotational speed, $n_{ZR}$, reached at point 15 following the down-shift, may be above the second shifting rotational speed, $n_{SH2}$.

Advantageously, the system prevents immediate re-up-shift after the down-shift, when a counter is started. A starting counter value is determined, which depends on the difference in transmission rotational speeds, $\Delta n_R$, namely the difference between the [down-shifting] transmission target rotational speed $n_{ZR}$ and the second shifting rotational speed, $n_{SH2}$. If the difference in transmission rotational speeds, $\Delta n_R$, is a relatively low value, such that the transmission target rotational speed $n_{ZR}$ is only slightly above the second shifting rotational speed $n_{SH2}$, the starting counter value is set relatively high. In this way, a relatively long time passes before the counter value of the counter reaches zero, and thus during this initial period the transmission is not up-shifted to a higher transmission stage.

Depending on the course of the rotational speed curve after the down-shift, the counter value will either decrease or increase. Here, if the speed reduction (or deceleration) is insufficient, the counter value will decrease. In the present example, the rotational speed increases, e.g. on a portion of the curve K5 (FIG. 3), to a point 16. At this point in time, the counter value may be decreased to zero, to allow an up-shift to a higher transmission stage (illustrated via curve segment K6 and point 17 in FIG. 3). If the speed reduction is sufficient, wherewith the rotational speed decreases (curve portion K4 in FIG. 3), there is no need or occasion to up-shift to a higher transmission stage, wherewith after a first phase of decreasing counter value during the period of increasing rotational speed after point 15, the counter value then increases.

Figure 4:
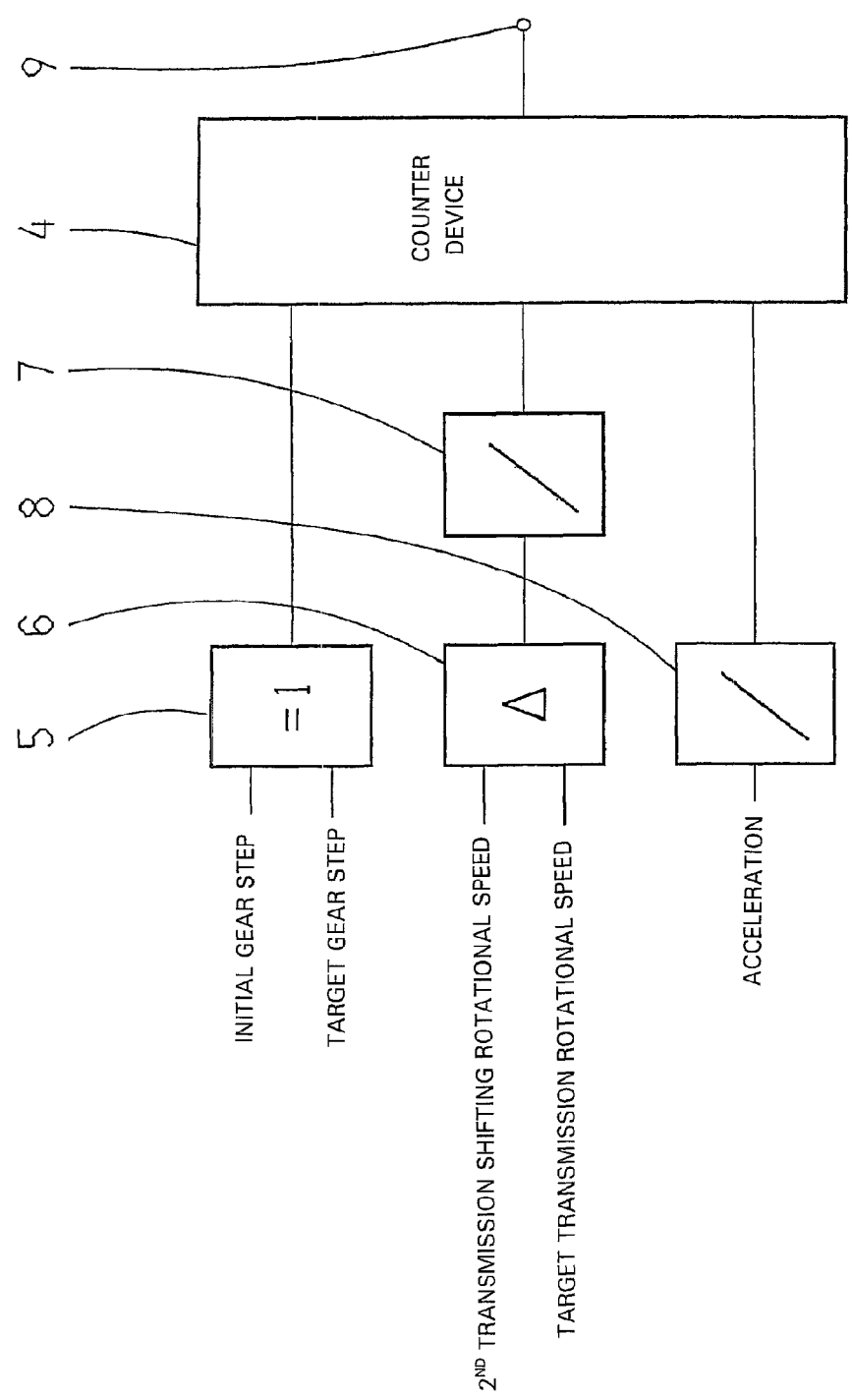
FIG. 4 is a schematic representation of the counter and the signals provided to the counter, for carrying out the inventive method.

In order to carry out the above-described method, a counter 4 must be provided, which receives input signals (see FIG. 4). If the signals of an initial transmission stage and a target transmission stage are input to a comparing element 5, and if there is a difference between the initial transmission stage and the target transmission stage, it will be determined that shifting has occurred. At that instant, the comparing element 5 initializes the counter 4. Also, the difference between—the second transmission shifting rotational speed and—the transmission target rotational speed is determined, by means of a differentiating element 6. The thus ascertained difference in transmission rotational speeds is input to a starting counter value characteristic curve 7, for determining the starting counter value, which then is passed to the counter 4.

Also the instantaneous acceleration of the vehicle is monitored, or, as mentioned supra, preferably the increase in the input rotational speed of the transmission is monitored. The value of the instantaneous acceleration is input to a characteristic curve 8, for determining a counter value to serve as an increment or decrement. This current counter value increment/decrement is input to the counter 4. Then the updated counter value is output at the output 9 of the counter 4, and is sent to the electronic control unit 3. If and when the updated counter value reaches zero, the transmission is shifted.

As mentioned above, it is preferred to have two counters 4, one for up-shifting and one for down-shifting, the transmission, so that the necessary calculations for up-shifting and down-shifting can be carried out simultaneously in parallel. This enables fast reaction of the process, and reduces shifting time.

The above-described method enables reduction of back and forth shifting, or at least reduction of the frequency of occurrence of back and forth shifting. In addition, down-shifting caused by a so-called "turbo cavity" can be reduced, as can shifting due to short-term topography variations; and shifting which can result from an acceleration signal which is altered by noise can be avoided. Thus, the method also performs the function of a low-pass filter.

LIST OF REFERENCE NUMERALS 1 drive engine.
2 automatic transmission with clutches.
3 electronic control unit.
4 counter.
5 comparing element.
6 differentiating device.
7 characteristic curve for the starting counter value.
8 characteristic curve for the counter value.
9 counter output.
10 shifting point at a first shifting rotational speed of the transmission, for up-shifting.
11 shifting point, at the target rotational speed of the transmission, after an up-shift.
12 shifting point of a high transmission stage, when the counter value reaches zero.
13 shifting point at a lower transmission stage.
14 shifting point at a first target rotational speed of the transmission, where a down-shift occurs.
15 shifting point, at the target rotational speed of the transmission, after a down-shift.
16 shifting point of a low transmission stage, when the counter value reaches zero.
17 shifting point at a higher transmission stage
n transmission rotational speed.
$n_{SH1}$ first transmission switching rotational speed, for an up-shift.
$n_{SR2}$ second transmission switching rotational speed, for a down-shift.
$n_{ZH}$ transmission target rotational speed, for an up-shift.
$n_{SR1}$ first transmission switching rotational speed, for a down-shift.
$n_{SH2}$ second transmission switching rotational speed, for an up-shift.
$n_{ZR}$ transmission target rotational speed, for a down-shift.
t time.

The invention claimed is:

1. A method of controlling an automatic transmission of a motor vehicle having clutches controlled by an electronic control unit, the method comprising the steps of:
   determining rotational speed of an initial transmission stage of the transmission;
   if a first transmission shifting rotational speed is reached, shifting the transmission from the initial transmission stage to a target transmission stage;
   ascertaining a target transmission rotational speed of the target transmission stage;
   ascertaining a speed difference between the target transmission rotational speed and a second shifting transmission rotational speed, with the second shifting transmission rotational speed comprising a rotational speed between the initial transmission rotational speed and the target transmission rotational speed;
   determining an initial counter value of a counter which depends on the transmission rotational speed difference;
   beginning at the initial counter value and counting with the counter as time progresses; and
   if and when a counter value reaches zero, shifting the transmission from the target transmission stage toward the initial transmission stage.

2. The method according to claim 1, further comprising the step of defining the target transmission stage as a higher transmission stage than the initial transmission stage, and the second transmission shifting rotational speed as a shifting rotational speed for down-shifting to a lower transmission stage in a direction toward the initial transmission stage.

3. The method according to claim 2, further comprising the step of, if the vehicle speed is increased such that a predetermined speed increase is exceeded, then raising the counter value commencing from the starting counter value.

4. The method according to claim 2, further comprising the step of, if the vehicle speed is increased such that the speed increase falls below a predetermined value, then lowering the counter value commencing from the starting counter value.

5. The method according to claim 2, further comprising the step of, if the value of the transmission rotational speed difference is relatively low, setting the starting counter value to a relatively high starting counter value.

6. The method according to claim 2, further comprising the step of, if the value of the transmission rotational difference is relatively high, setting the starting counter value to a relatively low starting counter value.

7. The method according to claim 1, further comprising the step of defining the target transmission stage as a lower transmission stage than the initial transmission stage, and the second transmission shifting rotational speed being a shifting rotational speed for an up-shifting into a higher transmission stage in the direction toward the initial transmission stage.

8. The method according to claim 7, further comprising the step of, if the vehicle is slowed such that a predetermined speed reduction value is exceeded, increasing the counter value below the starting counter value.

9. The method according to claim 7, further comprising the step of, if the vehicle is slowed in such a manner that a predetermined speed reduction is not exceeded, decreasing the counter value from the starting counter value.

10. The method according to claim 7, further comprising the step of, if the value of the transmission rotational speed difference is relatively low, setting the starting counter value to a relatively high starting counter value.

11. The method according to claim 7, further comprising the step of, if the value of the transmission rotational speed difference is relatively high, setting the starting counter value to a relatively low starting counter value.

12. The method according to claim 1, further comprising the step of employing one of a counter value characteristic curve (8) and a table of counter values to determine one of a decrement value and an increment value by which the starting counter value is to be one of respectively decreased and increased.

13. The method according to claim 12, further comprising the step of determining one of the decrement value and the increment value by which the counter value is to be respectively one of decreased and increased depending on at least one of a vehicle speed increase and an increase in a rotational speed of transmission input shaft.

14. The method according to claim 1, further comprising the step of, for at least one of an up-shift and a down-shift, determining the shifting rotational speeds continually and generally simultaneously in parallel.

15. The method according to claim 1, further comprising the step of employing, during one of an up-shift and a down-shift, a further independent counter to apply one of a respective increment and decrement.

16. The method according to claim 1, further comprising the step of retaining resolution of one of a given concrete up-shift and down-shift until the counter value (4) reaches zero.

* * * * *